United States Patent
Ghosh et al.

(10) Patent No.: US 11,080,735 B2
(45) Date of Patent: Aug. 3, 2021

(54) SYSTEM FOR PROACTIVELY PROVIDING A USER WITH PRESCRIPTIVE REMEDIES IN RESPONSE TO A CREDIT CARD TRANSACTION ERROR

(71) Applicant: Dell Products L.P., Round Rock, TX (US)

(72) Inventors: Mahuya Ghosh, Hyderabad (IN); Aravind Goud Dandu Laxmaiah, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 16/670,518

(22) Filed: Oct. 31, 2019

(65) Prior Publication Data
US 2021/0133789 A1  May 6, 2021

(51) Int. Cl.
*G06Q 30/02* (2012.01)
*G06Q 20/24* (2012.01)
*G06N 20/00* (2019.01)

(52) U.S. Cl.
CPC ......... *G06Q 30/0207* (2013.01); *G06N 20/00* (2019.01); *G06Q 20/24* (2013.01)

(58) Field of Classification Search
None
See application file for complete search history.

(56) References Cited

U.S. PATENT DOCUMENTS

| | | | |
|---|---|---|---|
| 10,552,837 B2* | 2/2020 | Jia | G06Q 40/02 |
| 10,726,491 B1* | 7/2020 | Hockey | G06F 16/24578 |
| 2007/0288641 A1* | 12/2007 | Lee | G06Q 30/0601 709/227 |
| 2010/0140346 A1* | 6/2010 | Loeb | G06Q 20/40 235/379 |
| 2011/0125619 A1* | 5/2011 | Talbert | G06Q 20/04 705/30 |
| 2011/0276468 A1* | 11/2011 | Lewis | G06Q 20/40 705/38 |

(Continued)

OTHER PUBLICATIONS

Machine Learning Software Engineering in Practice: An Industrial Case Study, Rahman et al., arXiv:1906.07154v1 [cs.SE] Jun. 17, 2019.*

(Continued)

*Primary Examiner* — David J Stoltenberg
(74) *Attorney, Agent, or Firm* — Terrile, Cannatti & Chambers; Stephen A. Terrile

(57) ABSTRACT

A method, system, and computer-usable medium for implementing a system providing a customer with prescriptive remedies in response to a credit card transaction error. At least one embodiment includes receiving a credit card transaction request for purchase of a product during a purchase session from a merchant; receiving a credit card transaction error from a payment gateway; passing the credit card transaction error, customer segment information, and customer score information to a prescriptive machine learning engine; analyzing the error type, customer segment information, and customer score information at the prescriptive machine learning engine to assign a proactive response to the credit card transaction error. The proactive response is selected to increase the likelihood that a customer will continue the purchase despite the decline of the credit card.

20 Claims, 7 Drawing Sheets

(56) References Cited

U.S. PATENT DOCUMENTS

| | | | |
|---|---|---|---|
| 2014/0180924 A1* | 6/2014 | Ozvat | G06Q 20/20 |
| | | | 705/44 |
| 2014/0279527 A1* | 9/2014 | Duke | G06Q 20/4016 |
| | | | 705/44 |
| 2016/0048421 A1* | 2/2016 | Hanson | G06Q 30/012 |
| | | | 705/302 |
| 2016/0321649 A1* | 11/2016 | Dragushan | G06Q 20/3224 |
| 2017/0213204 A1* | 7/2017 | Massoudi | H04L 67/02 |
| 2018/0053114 A1* | 2/2018 | Adjaoute | G06N 3/126 |
| 2018/0062937 A1* | 3/2018 | Narasimhan | H04L 41/0893 |
| 2018/0082306 A1* | 3/2018 | Hanson | G06F 11/0793 |
| 2018/0150843 A1* | 5/2018 | Adjaoute | G06N 5/04 |
| 2018/0307756 A1* | 10/2018 | Garay | G06N 20/00 |
| 2018/0350006 A1* | 12/2018 | Agrawal | G06F 7/026 |
| 2019/0164181 A1* | 5/2019 | Adjaoute | G06Q 30/0202 |
| 2019/0188771 A1* | 6/2019 | Rajagopal | G06Q 20/202 |
| 2019/0279208 A1* | 9/2019 | Muller | G06Q 20/4016 |
| 2019/0392441 A1* | 12/2019 | Lee | G06Q 20/00 |
| 2020/0034842 A1* | 1/2020 | Ponniah | G06N 3/084 |
| 2020/0058030 A1* | 2/2020 | Adjaoute | G06N 5/04 |
| 2020/0126085 A1* | 4/2020 | Roche | G06Q 20/202 |
| 2020/0265437 A1* | 8/2020 | Cash | G06Q 20/4016 |
| 2020/0380531 A1* | 12/2020 | Vaidya | G06Q 30/0185 |
| 2021/0097546 A1* | 4/2021 | Adjaoute | G06Q 30/0201 |

OTHER PUBLICATIONS

A data mining approach using transaction patterns for card fraud detection, Lee et al., arXiv:1306.5547v1 [cs.CR] Jun. 24, 2013.*
Amazon, About 1-Click Ordering, downloaded Oct. 31, 2019.

* cited by examiner

| Error Code | Real Time Monitoring & Analysis ||| Proactive Customer Assistance ||
|---|---|---|---|---|---|
| | Description | Approved | Explanation | Classification | Proactive Steps |
| 0 | Transaction Approved | Yes | The transaction was successful | NA | NA |
| 1 | Refer to Issuer | No | The customer's bank (Card Issuer) has indicated there is a problem with the credit card number. | Hard Decline | Prescriptive analytics system, in the same E-Commerce browser & session, informs the user of the nature of error, auto selects another payment instrument with instant discount valid for that session only. |
| 22 | Suspected Malfunction | No | The customer's bank (Card Issuer) cannot be contacted during the transaction. The customer should check the credit card information and try processing the transaction again. | Communication Errors | Prescriptive analytics system, in the same E-Commerce browser & session, informs the user of the nature of error, auto selects another payment instrument with instant discount valid for that session only. In the event, the customer doesn't want to proceed with the alternative payment method, the PAS creates a support ticket in real time. PAS Infroms the customer of the Estimated Resolution time. |
| 35 | Card Acceptor, Contact Acquirer, Retain Card | No | The customer's bank (Card Issuer) has declined the transaction and requested that the customer's credit card be retained (card reported lost or stolen). The customer should use an alternate credit card. | Fraud Nets | Prescriptive analytics system, in the same E-Commerce browser & session, asks the user to contact the Service Desk for security reasons & broadcasts information about that transactions to all relevant parties so that the fraud can be caught/prevented |
| 66 | Acceptor Contact Acquirer, Security | No | The customer's bank has declined the transaction and request the Merchant to contact the bank. The customer should use an alternate credit card. | Merchant Errors | Prescriptive analytics system, in the same E-Commerce browser & session, informs the user of the nature of error, auto selects another payment instrument with instant discount valid for that session only. In the event, the customer doesn't want to proceed with the alternative payment method, the PAS creates a support ticket in real time. PAS Infroms the customer of the Estimated |
| 91 | Card Issuer Unavailable | No | The customer's bank is unable to be contacted to authorise the transaction. The customer should attempt to process this transaction again. | Soft Decline | Prescriptive analytics system, in the same E-Commerce browser & session, informs the user of the nature of error, auto selects another payment instrument with instant discount valid for that session only. |

*Figure 3*

SYSTEM FOR PROACTIVELY PROVIDING A USER WITH PRESCRIPTIVE REMEDIES IN RESPONSE TO A CREDIT CARD TRANSACTION ERROR

BACKGROUND OF THE INVENTION

Field of the Invention

The present invention relates to information handling systems. More specifically, embodiments of the invention relate to a system for proactively providing a user with prescriptive remedies in response to a credit card transaction error.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system of one or more computers can be configured to perform particular operations or actions by virtue of having software, firmware, hardware, or a combination of them installed on the system that in operation causes or cause the system to provide prescriptive remedies for credit card errors occurring during a purchase session in which a customer attempts to purchase a product. One general aspect includes a computer-implemented method for proactively providing a customer with prescriptive remedies in response to a credit card transaction error, including: receiving a credit card transaction request for purchase of a product during a purchase session from a merchant; receiving a credit card transaction error from a payment gateway; passing the credit card transaction error, customer segment information, and customer score information to a prescriptive machine learning engine; analyzing the error type, customer segment information, and customer score information at the prescriptive machine learning engine to assign a proactive response to the credit card transaction error, where the proactive response includes one or more of: suggesting an alternative account to the customer for completing the purchase of the product; suggesting an alternative method of payment to the customer for completing the purchase of the product; and generating a dynamic discount for the product based on at least one of the customer segment and customer score, where the dynamic discount has a limited duration subject to completion of the purchase of the product during the purchase session. Other embodiments of this aspect include corresponding computer systems, apparatus, and computer programs recorded on one or more computer storage devices, each configured to perform the actions of the methods.

Another general aspect includes a system including a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: receiving a credit card transaction request for purchase of a product during a purchase session from a merchant; receiving a credit card transaction error from a payment gateway; passing the credit card transaction error, customer segment information, and customer score information to a prescriptive machine learning engine; analyzing the error type, customer segment information, and customer score information at the prescriptive machine learning engine to assign a proactive response to the credit card transaction error, where the proactive response includes one or more of: suggesting an alternative account to the customer for completing the purchase of the product; suggesting an alternative method of payment to the customer for completing the purchase of the product; and generating a dynamic discount for the product based on at least one of the customer segment and customer score, where the dynamic discount has a limited duration subject to completion of the purchase of the product during the purchase session.

Another general aspect includes a non-transitory, computer-readable storage medium embodying computer program code, the computer program code including computer executable instructions configured for: receiving a credit card transaction request for purchase of a product during a purchase session from a merchant; receiving a credit card transaction error from a payment gateway; passing the credit card transaction error, customer segment information, and customer score information to a prescriptive machine learning engine; analyzing the error type, customer segment information, and customer score information at the prescriptive machine learning engine to assign a proactive response to the credit card transaction error, where the proactive response includes one or more of: suggesting an alternative account to the customer for completing the purchase of the product; suggesting an alternative method of payment to the customer for completing the purchase of the product; and generating a dynamic discount for the product based on at least one of the customer segment and customer score, where the dynamic discount has a limited duration subject to completion of the purchase of the product during the purchase session.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows a chart showing information relating to exemplary error codes;

DETAILED DESCRIPTION

Figure 1:
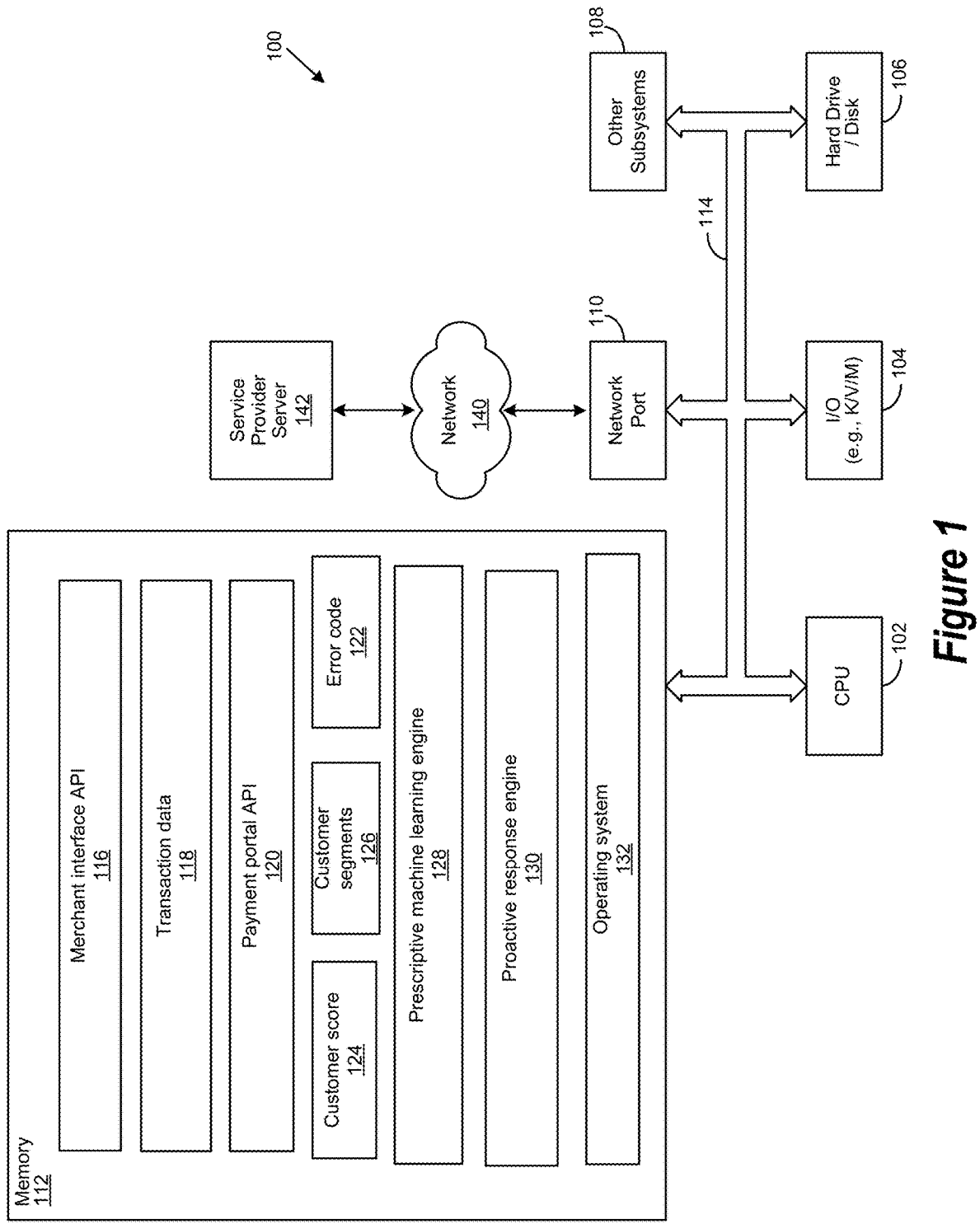
FIG. 1 is a generalized illustration of an information handling system 100 that is configured to implement certain embodiments of the system and method of the present disclosure.

A system, method, and computer-readable medium are disclosed for proactively providing a user with prescriptive remedies in response to a credit card transaction error. Certain aspects of the disclosure reflect an appreciation that credit card transaction errors can significantly impact the trust that a customer has with a merchant as well as lead to a decrease in sales. As an example, when the credit card of a customer attempting to execute a transaction with a merchant is declined, many customers don't follow through with the transaction or select a different online merchant for the product.

Attempts have been made to notify a customer that the credit card for a transaction has been declined. However, such notifications are static and do not provide the customer with insights into how the transaction may be completed despite the credit card transaction error. Certain embodiments of the present disclosure take a prescriptive and proactive approach to responding to credit card transaction errors. As an example, the type of credit card transaction error and other customer information may be provided to a prescriptive machine learning engine, where the information is analyzed to assign a proactive response to the credit card transaction error. In at least one embodiment, the proactive response includes suggesting an alternative account or alternative payment method to the customer for completing the purchase of the product. In at least one embodiment, the proactive response includes generating a dynamic discount for the product based on the analyzed information, where the dynamic discount has a limited duration that is subject to completion of the purchase of the product during the purchase session. In at least one embodiment, the proactive response includes automatically generating a service ticket to the credit card error for the merchant, determining a projected length of time that it is likely to take the merchant to resolve the service ticket, and communicating the service ticket information, including the projected length of time to resolve the service ticket, to the customer during the purchase session.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises an operating system (OS) 132 and in various embodiments may also comprise other software modules and engines configured to implement certain embodiments of the disclosed system.

Memory 112 includes storage for a plurality of software engines and Application Program Interfaces (APIs) that may be used to implement certain embodiments of the disclosed system. In certain embodiments, the system 100 includes a merchant interface API 116, which is configured to interface with web services provided by a merchant during e-commerce transactions. In certain embodiments, the information provided from the merchant includes transaction information such as customer identification information (such as, customer name, customer location, etc.), credit card information for the transaction, the product being purchased, merchant identification, and other information useful in conducting a commercial transaction to purchase a product from the merchant. In certain embodiments, the transaction data may be stored in transaction data 118 memory and communicated to a payment gateway through a payment portal API 120. In certain embodiments, the payment gateway is a merchant service provided by an e-commerce application service provider that authorizes credit card or direct payments processing for a business, online retailers, and/or traditional brick and mortar stores.

In certain instances, a credit card validation for the purchase is denied by the credit card issuing bank. The denial is received by the payment gateway and, in certain embodiments, forwarded to the payment portal API 120 with a corresponding error code. The error codes provided by the payment gateway in certain embodiments generally fall into five categories: hard declines; soft declines; fraud nets; communication errors; and merchant errors. In certain embodiments, error codes associated with the credit card denial are stored in error code 122 memory. In certain embodiments, the information handling system 100 accesses customer information from a database based on the customer identification provided in the transaction data 118. In certain embodiments, the accessed customer information includes a customer score 124 and one or more customer segments 126, which are provided to the input of a prescriptive machine learning engine 128. In certain embodiments, the prescriptive machine learning engine 128 employs the error code 122, one or more customer segments 126, and the customer score 124 to determine optimal response actions configured to allow the customer to complete the purchase.

In certain embodiments, the output of the prescriptive machine learning engine 128 is provided to a proactive response engine 130. In certain embodiments, the proactive response engine includes a chatbot that may use the merchant interface API 116 to present prescriptive options for the customer at the merchant web services to complete the purchase transaction. The prescriptive options conveyed to the customer by the proactive response engine 130 are dependent on the analysis executed by the prescriptive machine learning engine 128 with error code 122, the customer score 124, and customer segments 126. In at least one embodiment, the proactive response engine 130 responds to the prescriptive machine learning engine 128 with a suggestion that the customer complete the purchase of the product with another registered account. In one example, the customer may have two or more accounts registered with the merchant which may be used for customer purchases. In one embodiment, if the credit card for an original transaction is denied, the customer is presented with the alternative account information at a customer interface of the merchant web service and asked whether or not the customer wishes to complete the transaction with the alternative account. In at least one embodiment, the proactive response engine 130 responds to the prescriptive machine learning engine 128 by suggesting an alternative method of payment to the customer for completing the purchase of the product. For example, if the customer and/or customer transaction meets specific criteria as determined by the prescriptive machine learning engine 128, the customer may be asked whether the customer wishes to proceed with the transaction through an invoice or purchase order.

In at least one embodiment, the proactive response engine 130 responds to the prescriptive machine learning engine 128 by generating a dynamic discount for the product. In certain embodiments, wherein the dynamic discount has a limited duration. In one example, the dynamic discount is only available to the customer if the customer completes the purchase of the product during the same purchase session in which the credit card error occurred.

The amount of the dynamic discount may vary in accordance with a number of different factors. In one example, the dynamic discount may be a function of the customer segment, customer score, the opportunity costs (for example the cost to the merchant if the transaction fails, the amount of marketing money spent by the merchant to acquire the customer, and other business metrics related to the merchant's product line), and the likelihood that the customer will complete the transaction during the purchase session. In certain embodiments, the likelihood that the user will complete the transaction may be based on the propensity of the customer to make purchases with the merchant and, for example, may be included in the determination of the customer score. In certain embodiments, the amount of the dynamic discount may be determined, at least in part, using the prescriptive machine learning engine 128. In certain embodiments, the dynamic discount is provided as an option only if the customer opts not to complete the purchase of the product using the alternative account and/or alternative method of payment.

In certain embodiments, the prescriptive machine learning engine 128 is configured to classify a customer into customer segments. In one example, the prescriptive machine learning engine 128 is trained to classify the customer using customer data including, for example, customer size, past purchases of customer, whether the customer is a new customer or existing customer, credit history of the customer with the merchant, and initial engagement and continuing engagement factors of the customer based on, for example, survey respondents data. In certain embodiments, the initial engagement factors may include data relating to customer answers as to why the customer initially became a customer of the merchant (for example, the location of the merchant, the features of the product provided by the merchant, the price of the product by the merchant, discounts provided by the merchant, brands names offered by the merchant, etc.). Continuing engagement factors may include, for example, customer service, as well as merchant location, product features, price, discounts, etc.). In certain embodiments, the customer data may include factors indicative of why the customer chose the merchant over the merchant's competitors (such as, for example, personal contact, content marketing, product features, location, price, discounts, etc.).

In certain embodiments, the customer score is determined using factors relating to the propensity of the customer to purchase a product within a given time frame (such as, for example, during a single purchase session, after a measured time browsing the merchant's website, after multiple browsing sessions of the merchant's website, etc.). In certain embodiments, the customer score is determined using customer data relating to whether the customer is a new customer or existing customer, the credit score of the customer, frequency of customer transactions with the merchant, the value of the product that is the subject of the current transaction, the type of product; the historic purchase pattern of the customer, the location of the customer, time of month in which the credit card transaction request is made, and the seasonality of the time at which the credit card transaction request is made.

In certain instances, the customer may elect not to proceed with the alternative account and/or alternative method despite the availability of the dynamic discount. When the customer decides not to proceed with the transaction, certain embodiments of the information handling system 100 may generate a service ticket relating to the credit card error for the merchant. In certain embodiments, the service ticket information may be stored electronically for subsequent accessed to generate a merchant dashboard reflecting credit card error activity. In certain embodiments, the information handling system 100 makes a determination as to the project length of time that the merchant will need to resolve the service ticket. In certain embodiments, the service ticket information, including the projected length of time to resolve the service ticket, is communicated to the customer during the purchase session.

Figure 2:
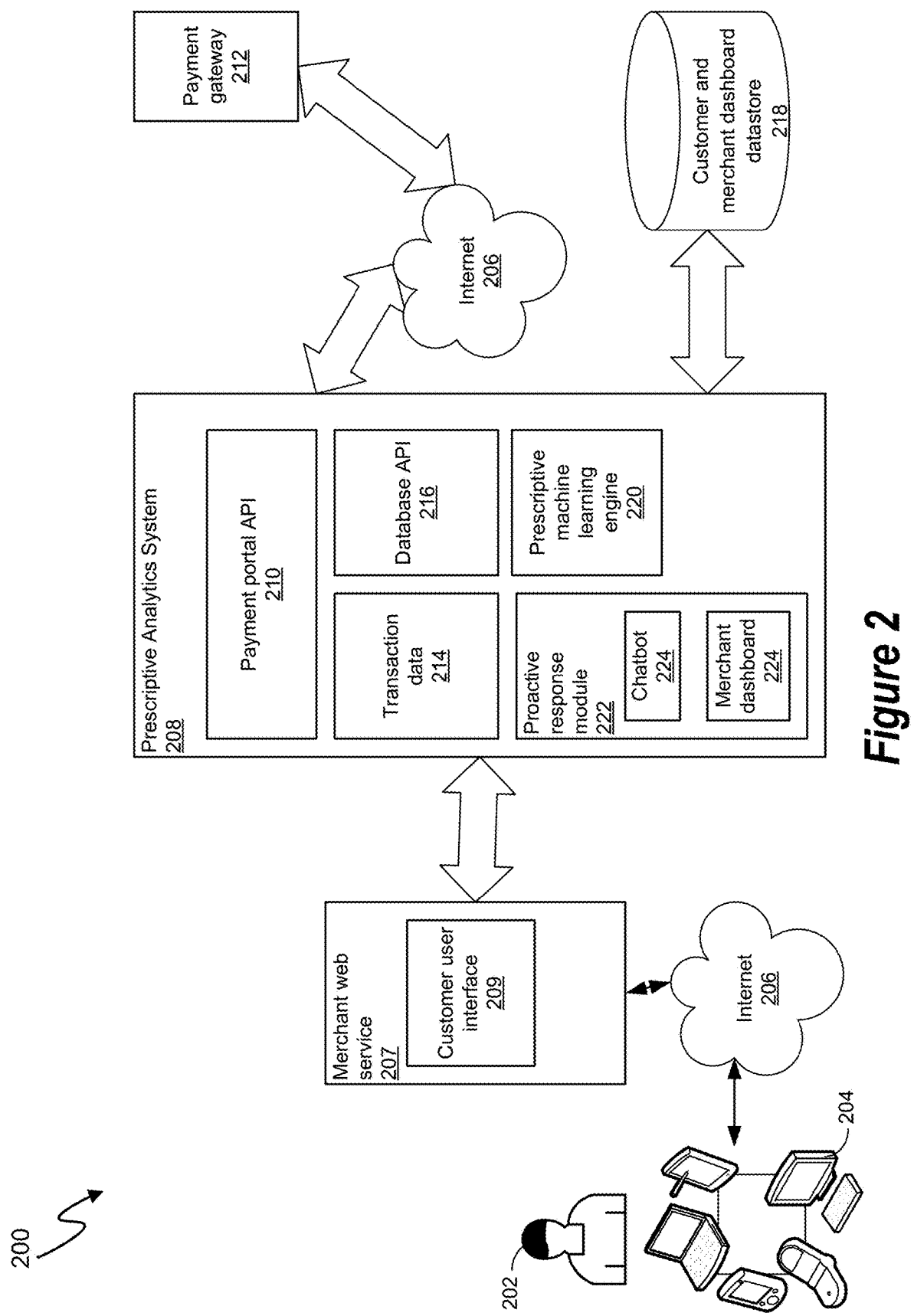
FIG. 2 shows one example of an electronic environment in which certain embodiments of the disclosed system may operate.

FIG. 2 shows an exemplary electronic environment 200 in which the disclosed system may be implemented. In this example, a customer 202 interacts with one or more devices 204 over a network, such as the Internet 206. Devices 204 may include a web browser or other user application that is configured to communicate with a merchant web service 207. In certain embodiments, the merchant web service provides a customer user interface 209, such as a webpage, which allows the customer 202 to select a product for purchase and to provide information, such as credit card data, that the merchant may use to complete the transaction. The transaction information, including the credit card information, is provided to a prescriptive analytics system 208. In this example, the prescriptive analytics system 208 includes a payment portal API 210 that is configured to communicate the credit card information over the Internet 206 to a payment gateway 212. The payment gateway 212 is configured to communicate with the agency that issued the customer's credit card.

If the credit card transaction was declined, the payment gateway 212 receives an error code from the issuing agency and communicates the error code to the prescriptive analytics system 208 through the payment portal API 210. The error code is used to identify the type of error that occurred during the credit card transaction. As noted herein, there are a number of different types of errors that may result in the declining of a credit card. In certain embodiments, the errors are represented by error codes. In certain embodiments, the error codes, customer identification information, etc., may be stored as transaction data 214.

Certain embodiments of the prescriptive analytics system 208 include a database API 216 that is configured to access customer information and merchant dashboard records from customer and merchant data storage 218. In certain embodiments, the customer data may include transaction information history, auditing logs, survey data, customer name, customer type, customer organization size, customer location, merchant identifier, merchant location, products offered by the merchant, merchant discount history, etc.

In certain embodiments, the proactive response to 222 includes a merchant dashboard engine 226. In certain embodiments, the merchant dashboard engine 224 retrieves data from the customer and merchant dashboard datastore 218 to provide the merchant with information that the merchant may use to resolve any merchant and/or communication errors. As noted in connection with FIG. 7, the merchant dashboard data may be presented to a merchant in a variety of different manners.

In certain embodiments, the customer score and customer segments have been pre-assessed for the customers and stored in customer data storage 218. Additionally, or in the alternative, customer scores and customer segments may be calculated in real-time by a prescriptive machine learning engine 220 using, for example, transaction data 214 and current customer data accessed from the customer data storage 218.

In certain embodiments, the customer scores and customer segments are used by the prescriptive machine learning engine 220 to identify a proactive response that is intended to increase the likelihood that the customer 202 will complete the purchase despite the initial credit card decline. In certain embodiments, the identified response is provided to a proactive response module 222, which cooperates with other elements in environment 200 to carry out any actions associated with the proactive response. In certain embodiments, communications associated with the proactive response are conveyed to the customer 202 from, for example, a chatbot 224 to the customer user interface 209.

If the customer elects to proceed with the transaction using an alternative payment method, certain embodiments of the proactive response module 222 submit the information for the alternative credit card to the payment gateway 212 for authorization. If the customer elects to cancel the transaction in response to the decline of the customer's credit card, certain embodiments of the proactive response module 222 generate a service ticket for use by the merchant, calculate an estimated time for the merchant's response to the service ticket, and communicate service ticket information (such as, for example, description of the type of credit card error, description of the actions that will be undertaken by the merchant, the estimated time for response, etc.) to the customer through, for example, chatbot 224.

FIG. 3 shows a chart 300 illustrating exemplary error codes, error code descriptions, whether the credit card transaction associated with each error code was approved or denied, an explanation of the reasons the credit card transaction was declined, a classification for the error code, and exemplary proactive steps that may be executed by certain embodiments of the prescriptive analytics system 208 in response to the error codes. The error codes are typically standardized and may be numerous (for example, ninety-six error codes). FIG. 3 shows examples of a hard decline (for example, error code 1), a communication error (for example, error 22), a fraud net decline (for example error 35), a merchant error (for example, error 66), and a soft decline (for example, error 91).

Figure 4:
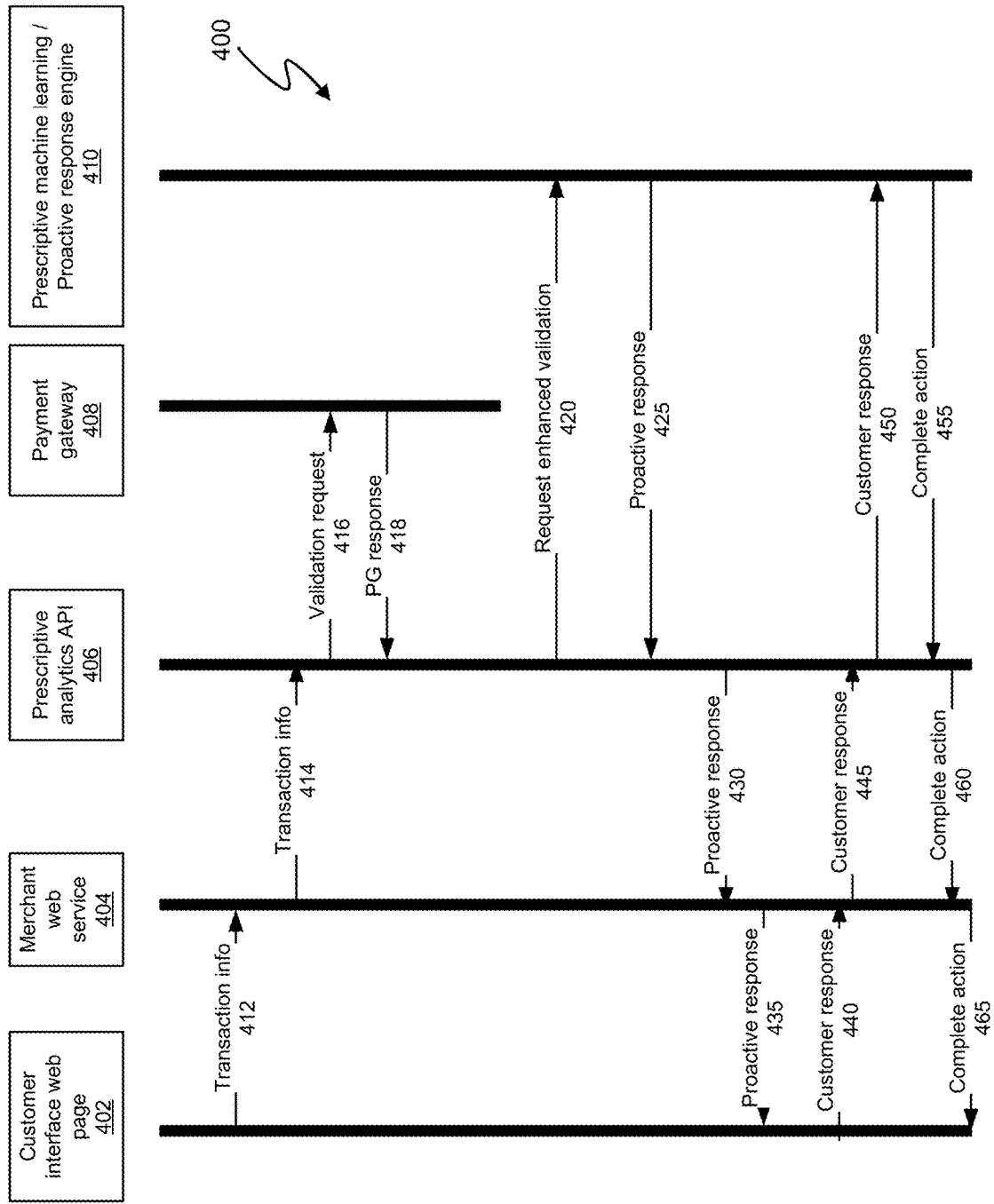
FIG. 4 is a flowchart showing exemplary communications that take place between various functional elements in certain embodiments of the disclosed system.

FIG. 4 is a flowchart 400 showing exemplary communications that take place between various functional elements in certain embodiments of the disclosed system. In the specific example shown in FIG. 4, the exemplary functional elements include a customer interface webpage 402, a merchant web service 404, a prescriptive analytics API 406, a payment gateway 408, and a prescriptive machine learning/proactive response engine 410.

In certain embodiments, the customer enters transaction information, including credit card information, at the customer interface webpage 402. The transaction information 412 is formatted and passed to the merchant web service 404, which passes the transaction information 414 to the prescriptive analytics API 406. In certain embodiments, the prescriptive analytics API 406 generates a validation request 416 to the payment gateway 4084 validation. The payment gateway 408 communicates a response at 418 indicating whether the credit card transaction was approved or declined. In those instances in which the credit card transaction has been declined, the prescriptive analytics API 406 passes the error code, credit card information, and any information needed to identify the customer to the prescriptive machine learning/proactive response engine 410 to request an enhanced validation 420. In certain embodiments, the enhanced validation request is used by the prescriptive machine learning/proactive response engine 410 as a notification that the credit card transaction failed and that a prescriptive/proactive response is to be generated to the customer. In certain embodiments, a proactive response 425 is conveyed from the prescriptive machine learning/proactive response engine 410 to the prescriptive analytics API 406, to the merchant web service 404, which communicates the proactive response 430 to the merchant web service 404, which then communicates the proactive response 435 to the customer at the customer interface webpage 402.

In certain embodiments, the customer responds to any suggestions provided in the proactive response 435 at the customer interface webpage 402. In certain embodiments, the customer response 440 is communicated to the merchant web service 404, which communicates the customer response 445 to the prescriptive analytics API 406, which communicates the customer response 450 to the prescriptive machine learning/proactive response engine 410. In certain embodiments, the prescriptive machine learning/proactive response engine 410 completes any action authorized in the customer response 450 and sends a notification 455 that the action has been completed to the prescriptive analytics API 406. A notification 460 that the action has been completed is communicated to the merchant web service 404, which sends a notification of completion 465 to the customer at the customer interface webpage 402.

Figure 5:
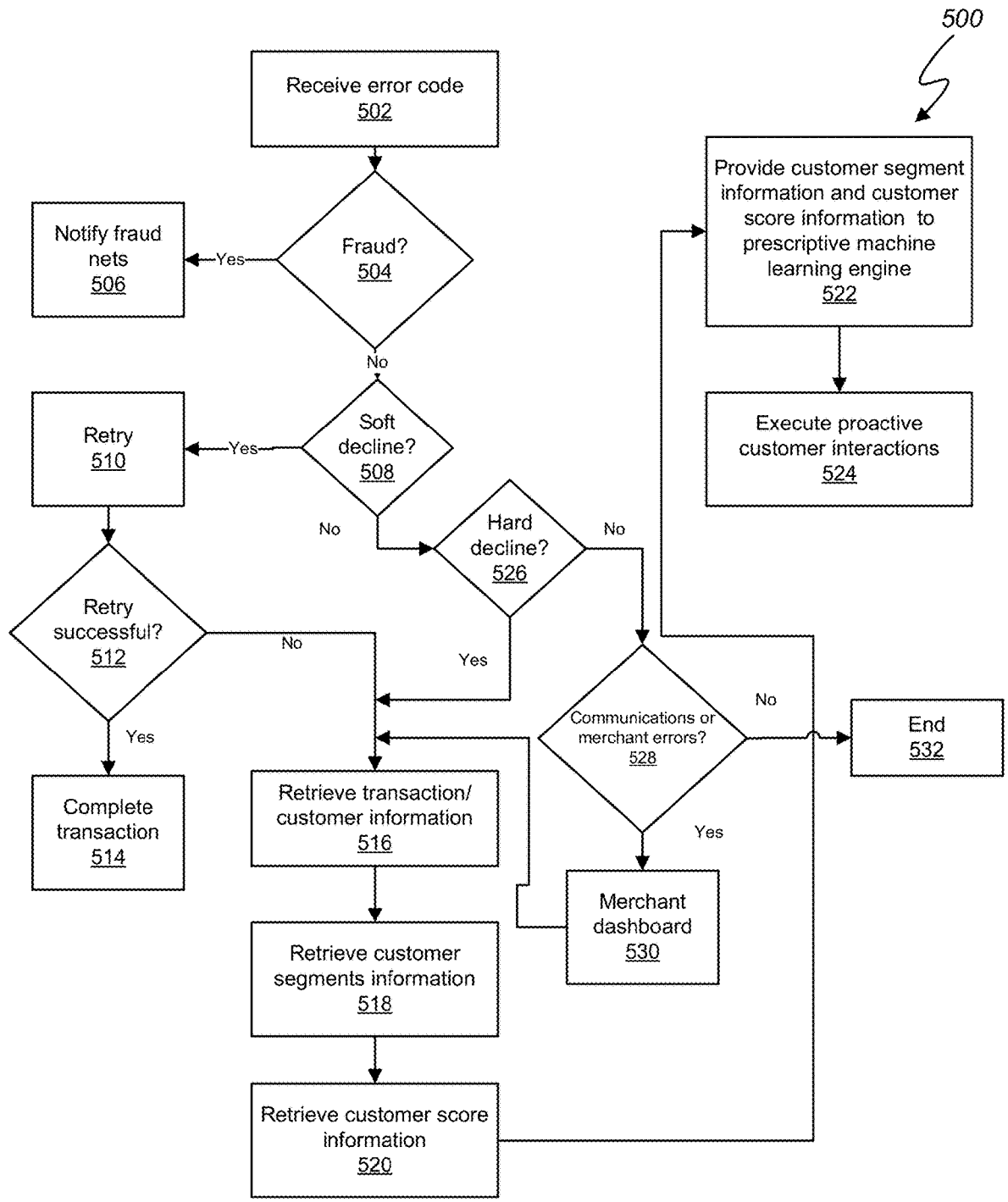
FIG. 5 is a flowchart showing exemplary operations that may be executed in some embodiments of the disclosed system in response to certain error code types.

FIG. 5 shows a flowchart 500 describing exemplary operations that may be executed in some embodiments of the disclosed system in response to certain error code types. In the example shown in FIG. 5, the code is received at operation 502 and checked at operation 504 to determine whether the error code corresponds to a fraud error type. If the error code corresponds to a fraud error type, fraud nets are notified at operation 506, and the customer is requested to contact the customer's bank for further information as to why the credit card was declined.

In certain embodiments, a determination as to whether the error code corresponds to a soft decline is made at operation 508. If the error code corresponds to a soft decline, certain embodiments retry the authorization at operation 510. If the authorization retry is successful at operation 512, the transaction is completed at operation 514.

In certain embodiments, a determination is made at operation 526 to determine whether the error code corresponds to a hard decline. If the error code corresponds to a hard decline, then the customer information and transaction information associated with the purchase session are retrieved at operation 516. Customer segments and/or information needed to generate customer segments is provided at operation 518 in certain embodiments. Further, customer scores and/or information needed to generate customer scores is retrieved at operation 520. In certain embodiments, the information retrieved at operation 518 and operation 520 is provided to a prescriptive machine learning engine at operation 522, which determines a proactive response that is most likely to cause the customer to complete the purchase. In certain embodiments, the proactive customer interactions are executed at operation 524.

In certain embodiments, a determination is made at operation 528 as to whether the error corresponds to a communication error or merchant error. If the error code corresponds to a merchant error or communication error, then the customer information and transaction information associated with the purchase session is retrieved at operation 516. Customer segments and/or information needed to generate customer segments is provided at operation 518 in certain embodiments. Further, customer scores and/or information needed to generate customer scores is retrieved at operation 520. In certain embodiments, the information retrieved at operation 518 and operation 520 is provided to a prescriptive machine learning engine at operation 522, which determines a proactive response that is most likely to cause the customer to complete the purchase. In certain embodiments, the proactive customer interactions are executed at operation 524. Additionally, these error code details are stored at operation 530 and are available for presentation presented in a merchant dashboard for further analysis and long term resolution to reduce the occurrence of such merchant and/or communication errors. If it is determined at operation 530 that the error is neither a communication nor merchant error, the process ends at operation 532.

Otherwise, the customer information and transaction information associated with the purchase session is retrieved at operation 516. Customer segments and/or information needed to generate customer segments is provided at operation 518 in certain embodiments. Further, customer scores and/or information needed to generate customer scores is retrieved at operation 520. In certain embodiments, the customer score may be determined using a machine learning algorithm, such as ordinary least squares, linear least squares, linear regression, logistic regression, polynomial regression, stepwise regression, ridge regression, lasso regression, elastic net regression or another similar regression algorithm. In certain embodiments, the information retrieved at operation 518 and operation 520 is provided to a prescriptive machine learning engine at operation 522, which determines a proactive response that is most likely to cause the customer to complete the purchase. In certain embodiments, the proactive customer interactions are executed at operation 524.

Figure 6:
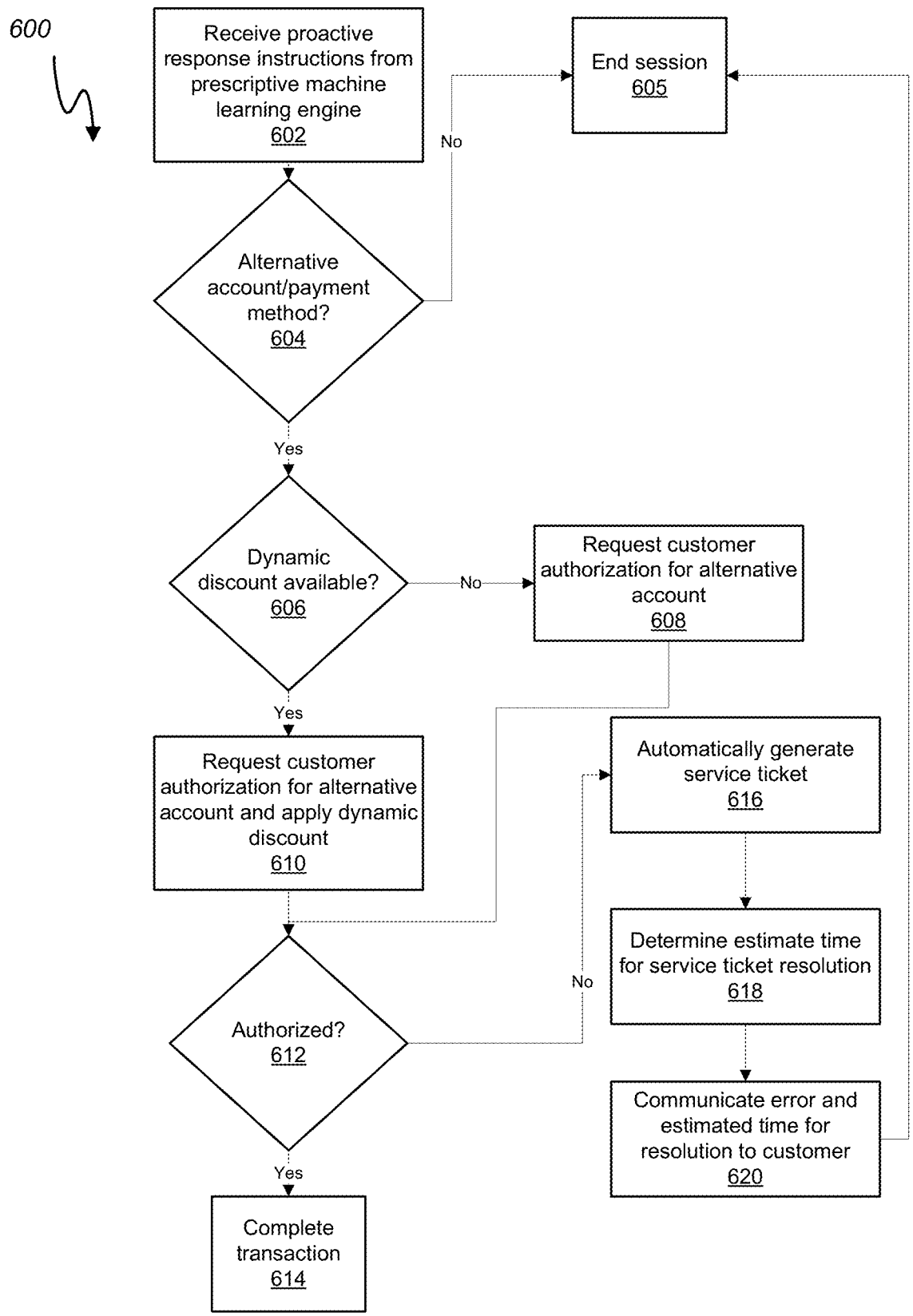
FIG. 6 is a flowchart showing exemplary operations that may be executed in some embodiments of the disclosed system pursuant to executing one or more proactive responses.

FIG. 6 shows a flowchart 600 describing exemplary operations that may be executed in some embodiments of the disclosed system pursuant to execute one or more proactive responses. In the specific example shown in FIG. 6, proactive response instructions are received from the prescriptive machine learning engine at operation 602. At operation 604, a determination is made as to whether the proactive response allows an alternative account/payment method. If an alternative account/payment method is not allowed at operation 604, the session ends at operation 605. If an alternative account/payment method is allowed as part of the proactive response, a determination is made at operation 606 as to whether the customer is eligible for a dynamic discount in the same purchase session. If a dynamic discount is not available, the customer is requested to authorize the alternative account/payment method at operation 608. However, if a dynamic discount is available at operation 606, the customer is requested to authorize payment with the alternative account and apply the dynamic discount at operation 610. In certain embodiments, the customer authorizes completion of the purchase using the alternative account/payment method at operation 612, and the transaction is completed at operation 614. In certain embodiments, if the user does not authorize the suggested proactive response at operation 612, a service ticket is automatically generated at operation 616, and an estimate time for service ticket resolution is determined at operation 618. In certain embodiments, information relating to the air, service ticket, and time for resolution is communicated to the customer at operation 620.

Figure 7:
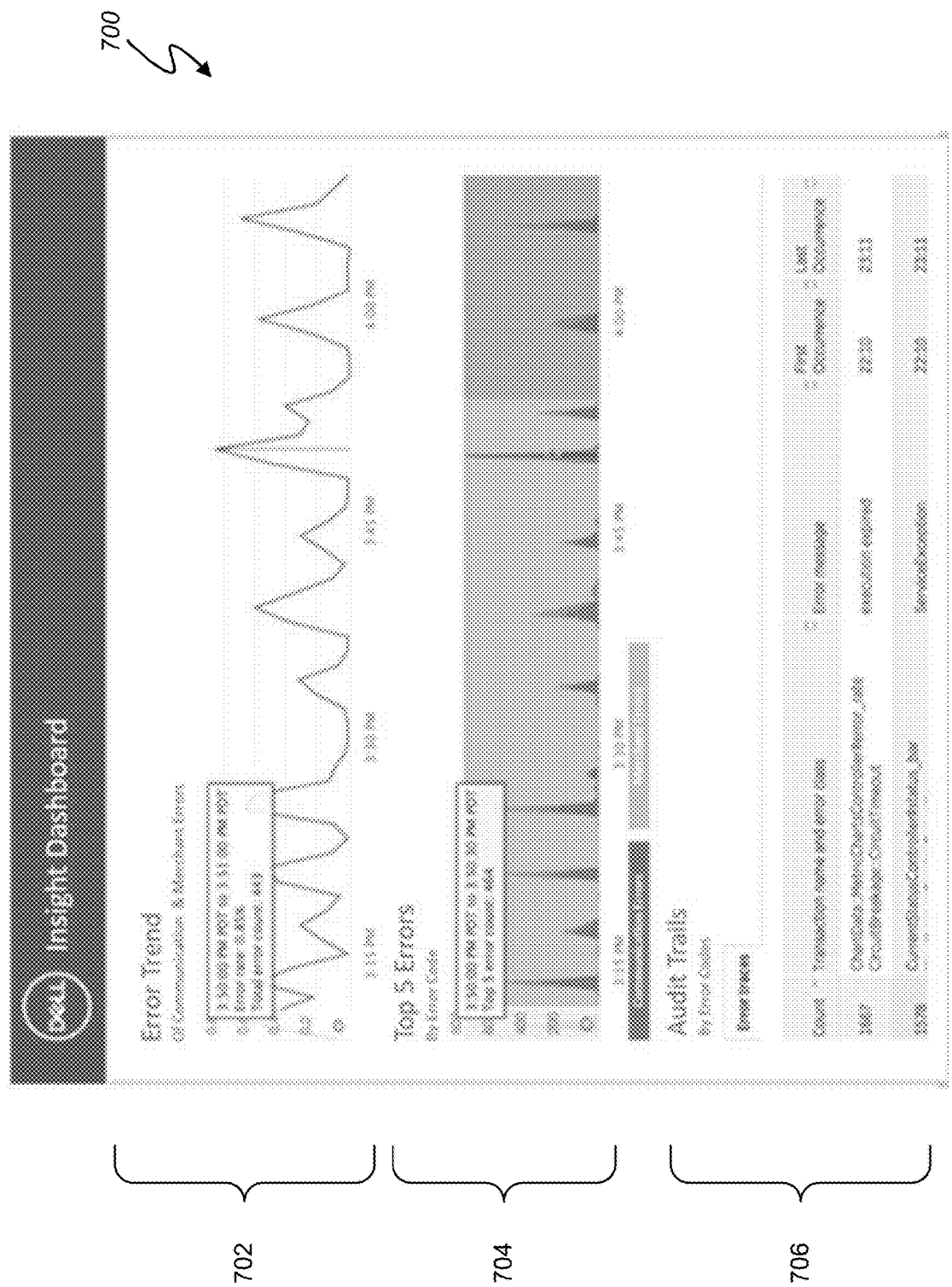
FIG. 7 shows an exemplary insight dashboard that may be used to provide the merchant with insights as to the communication and merchant errors occurring during customer transactions with the merchant.

FIG. 7 shows an exemplary insight dashboard 700 that may be used to provide the merchant with insights as to the communication and merchant errors occurring during customer transactions with the merchant. In certain embodiments, the information handling system maintains a log of information relating to communication and merchant errors. In certain embodiments, the logged information is retrieved and presented to the merchant in a format suitable for the merchant to track and, if possible, correct the identified problems. In the example shown in FIG. 7, the dashboard includes information relating to error trends over time as screen region 702. In screen region 704, certain embodiments may identify the top five errors occurring over time. In screen region 706, certain embodiments provide an audit trail of log entries for the individual merchant and communication errors.

As will be appreciated by one skilled in the art, the disclosed system may be embodied as a method, system, or computer program product. Accordingly, embodiments of the invention may be implemented in hardware, in software (including firmware, resident software, micro-code, etc.) or in an embodiment combining software and hardware. Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for proactively providing a customer with prescriptive remedies in response to a credit card transaction error, comprising:
    receiving a credit card transaction request for purchase of a product during a purchase session from a merchant;
    receiving a credit card transaction error from a payment gateway;
    passing the credit card transaction error, customer segment information, and customer score information to a prescriptive machine learning engine;
    analyzing the error type, customer segment information, and customer score information at the prescriptive machine learning engine to assign a proactive response to the credit card transaction error, wherein the proactive response includes one or more of:
        suggesting an alternative account to the customer for completing the purchase of the product;
        suggesting an alternative method of payment to the customer for completing the purchase of the product; and
        generating a dynamic discount for the product based on at least one of the customer segment and customer score, wherein the dynamic discount has a limited duration subject to completion of the purchase of the product during the purchase session.

2. The computer-implemented method of claim 1, wherein
    the credit card transaction error corresponds to one or more transaction error types including:
        a hard decline;
        a soft decline;
        a fraud net;
        a communication error; and
        a merchant error.

3. The computer-implemented method of claim 1, wherein
    the dynamic discount has a value determined by the prescriptive machine learning engine using the customer segment information or customer score information.

4. The computer-implemented method of claim 3, wherein
    the dynamic discount is provided as an option if the customer opts not to complete the purchase of the product using the alternative account and/or alternative method of payment.

5. The computer-implemented method of claim 1, wherein the prescriptive machine learning engine is configured to classify a customer into customer segments, wherein the prescriptive machine learning engine is trained to classify the customer using customer segment information comprising one or more of:

customer size;
past purchases of the customer;
whether the customer is a new customer or existing customer;
credit history with the merchant; and
initial engagement and continuing engagement factors of the customer based on surveyed data.

6. The computer-implemented method of claim 1, wherein the customer score information includes factors relating to a propensity of the customer to purchase a product within a time frame, and wherein the customer score is determined using customer score information relating to one or more of:
whether the customer is a new customer or existing customer;
credit score of the customer;
frequency of customer transactions with the merchant;
a value of the product that is the subject of the transaction;
the type of good or service;
historic purchase pattern of the customer;
location of the customer;
time of a month in which the credit card transaction request is made; and
seasonality of a time at which the credit card transaction request is made.

7. The computer-implemented method of claim 1, wherein the one or more proactive responses further include:
generating a service ticket relating to the credit card error for the merchant;
determining a projected length of time to resolve the service ticket; and
communicating service ticket information, including the projected length of time to resolve the service ticket, to the customer during the purchase session.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a credit card transaction request for purchase of a product during a purchase session from a merchant;
receiving a credit card transaction error from a payment gateway;
passing the credit card transaction error, customer segment information, and customer score information to a prescriptive machine learning engine;
analyzing the error type, customer segment information, and customer score information at the prescriptive machine learning engine to assign a proactive response to the credit card transaction error, wherein the proactive response includes one or more of:
suggesting an alternative account to the customer for completing the purchase of the product;
suggesting an alternative method of payment to the customer for completing the purchase of the product; and
generating a dynamic discount for the product based on at least one of the customer segment and customer score, wherein the dynamic discount has a limited duration subject to completion of the purchase of the product during the purchase session.

9. The system of claim 8, wherein
the credit card transaction error corresponds to one or more transaction error types including:
a hard decline;
a soft decline;
a fraud net;
a communication error; and
a merchant error.

10. The system of claim 8, wherein
the dynamic discount has a value determined by the prescriptive machine learning engine using the customer segment information or customer score information.

11. The system of claim 10, wherein
the dynamic discount is provided as an option if the customer opts not to complete the purchase of the product using the alternative account and/or alternative method of payment.

12. The system of claim 8, wherein the prescriptive machine learning engine is configured to classify a customer into customer segments, wherein the prescriptive machine learning engine is trained to classify the customer using customer segment information comprising one or more of:
customer size;
past purchases of the customer;
whether the customer is a new customer or existing customer;
credit history with the merchant; and
initial engagement and continuing engagement factors of the customer based on surveyed data.

13. The system of claim 8, wherein the customer score information includes factors relating to a propensity of the customer to purchase a product within a time frame, and wherein the customer score is determined using customer score information relating to one or more of:
whether the customer is a new customer or existing customer;
credit score of the customer;
frequency of customer transactions with the merchant;
a value of the product that is the subject of the transaction;
the type of good or service;
historic purchase pattern of the customer;
location of the customer;
time of a month in which the credit card transaction request is made; and
seasonality of a time at which the credit card transaction request is made.

14. The system of claim 8, wherein the one or more proactive responses further include:
generating a service ticket relating to the credit card error for the merchant;
determining a projected length of time to resolve the service ticket; and
communicating service ticket information, including the projected length of time to resolve the service ticket, to the customer during the purchase session.

15. A non-transitory, computer-readable storage medium embodying computer program code, the computer program code comprising computer executable instructions configured for:
receiving a credit card transaction request for purchase of a product during a purchase session from a merchant;
receiving a credit card transaction error from a payment gateway;

passing the credit card transaction error, customer segment information, and customer score information to a prescriptive machine learning engine;

analyzing the error type, customer segment information, and customer score information at the prescriptive machine learning engine to assign a proactive response to the credit card transaction error, wherein the proactive response includes one or more of:

suggesting an alternative account to the customer for completing the purchase of the product;

suggesting an alternative method of payment to the customer for completing the purchase of the product; and generating a dynamic discount for the product based on at least one of the customer segment and customer score, wherein the dynamic discount has a limited duration subject to completion of the purchase of the product during the purchase session.

16. The non-transitory, computer-readable storage medium of claim 15, wherein the credit card transaction error corresponds to one or more transaction error types including:

a hard decline;

a soft decline;

a fraud net;

a communication error; and a merchant error.

17. The non-transitory, computer-readable storage medium of claim 15, wherein the dynamic discount has a value determined by the prescriptive machine learning engine using the customer segment information or customer score information.

18. The non-transitory, computer-readable storage medium of claim 17, wherein the dynamic discount is provided as an option if the customer opts not to complete the purchase of the product using the alternative account and/or alternative method of payment.

19. The non-transitory, computer-readable storage medium of claim 15, wherein the prescriptive machine learning engine is configured to classify a customer into customer segments, wherein the prescriptive machine learning engine is trained to classify the customer using customer segment information comprising one or more of:

customer size;

past purchases of the customer;

whether the customer is a new customer or existing customer;

credit history with the merchant; and initial engagement and continuing engagement factors of the customer based on surveyed data.

20. The non-transitory, computer-readable storage medium of claim 15, wherein the customer score information includes factors relating to a propensity of the customer to purchase a product within a time frame, and wherein the customer score is determined using customer score information relating to one or more of:

whether the customer is a new customer or existing customer;

credit score of the customer;

frequency of customer transactions with the merchant;

a value of the product that is the subject of the transaction;

the type of good or service;

historic purchase pattern of the customer;

location of the customer;

time of a month in which the credit card transaction request is made; and seasonality of a time at which the credit card transaction request is made.

* * * * *